US011556337B2

(12) United States Patent
Chandrasekaran et al.

(10) Patent No.: US 11,556,337 B2
(45) Date of Patent: Jan. 17, 2023

(54) PARALLEL MATRIX MULTIPLICATION TECHNIQUE OPTIMIZED FOR MEMORY FETCHES

(71) Applicant: Analog Devices International Unlimited Company, Limerick (IE)

(72) Inventors: Praveen Chandrasekaran, Bangalore (IN); Vinoth Kumar Rajasekar, Trichy (IN); Shreeja Sugathan, Kota (IN)

(73) Assignee: Analog Devices International Unlimited Company, Limerick (IE)

( * ) Notice: Subject to any disclaimer, the term of this patent is extended or adjusted under 35 U.S.C. 154(b) by 128 days.

(21) Appl. No.: 17/228,484

(22) Filed: Apr. 12, 2021

(65) Prior Publication Data

US 2022/0326945 A1 Oct. 13, 2022

(51) Int. Cl.
*G06F 9/30* (2018.01)
*G06F 7/53* (2006.01)
(Continued)

(52) U.S. Cl.
CPC .............. *G06F 9/3001* (2013.01); *G06F 7/53* (2013.01); *G06F 9/30047* (2013.01); *G06F 9/544* (2013.01); *G06F 17/16* (2013.01)

(58) Field of Classification Search
CPC ...... G06F 9/3001; G06F 7/53; G06F 9/30047; G06F 9/544; G06F 17/16
See application file for complete search history.

(56) References Cited

U.S. PATENT DOCUMENTS 10,140,251 B2 * 11/2018 Zhou .................... G06F 9/3895
10,318,308 B2    6/2019 Dogon et al.
(Continued)

FOREIGN PATENT DOCUMENTS

CN    103294648 B    6/2016
CN    103530276 B    6/2016
(Continued)

OTHER PUBLICATIONS

CN-108537330-A, Chen, "Convolution Calculating Apparatus And Method For Neural Network" (Year: 2018).*
(Continued)

*Primary Examiner* — Farley Abad
(74) *Attorney, Agent, or Firm* — Schwegman Lundberg & Woessner, P.A.

(57) ABSTRACT

A matrix multiplication circuit comprises a memory storage device, processing circuitry, a parallel multiply circuit, and buffer circuits. The parallel multiply circuit simultaneously performs a count of multiplies in a parallel multiplication operation. The buffer circuits include prefetch buffer circuits each having a storage array dimension corresponding to the count of multiplies in the parallel multiplication operation. The processing circuitry loads a first prefetch buffer circuit with values from the first matrix; fetches a value of the second matrix and, in parallel with the fetch, preload the second prefetch buffer circuit with another value from the first matrix; initiates a parallel multiply of the fetched value of the second matrix and the values in the first prefetch buffer circuit; and stores partial product results of the parallel multiply, including adding a current partial product result to a previously stored partial product result.

20 Claims, 27 Drawing Sheets

(51) Int. Cl.
*G06F 17/16* (2006.01)
*G06F 9/54* (2006.01)

(56) References Cited

U.S. PATENT DOCUMENTS

| | | |
|---|---|---|
| 10,324,689 B2 | 6/2019 | Kalsi et al. |
| 10,354,733 B1 | 7/2019 | Zejda et al. |
| 10,409,887 B1 | 9/2019 | Gauria et al. |
| 10,521,225 B2 | 12/2019 | Raghavan et al. |
| 2018/0253402 A1* | 9/2018 | Redfern ............... G06F 17/141 |
| 2019/0171448 A1 | 6/2019 | Chen et al. |
| 2019/0340486 A1 | 11/2019 | Mills et al. |
| 2020/0133991 A1 | 4/2020 | Kazakov et al. |
| 2020/0272479 A1 | 8/2020 | Jiang et al. |
| 2021/0019631 A1* | 1/2021 | Das ..................... G06F 9/3893 |
| 2021/0049230 A1* | 2/2021 | Fleischer ............... G06F 17/16 |

FOREIGN PATENT DOCUMENTS

| | | |
|---|---|---|
| CN | 104899182 B | 10/2017 |
| JP | 2020042479 A | 3/2020 |

OTHER PUBLICATIONS

Kumar, Vinay B, et al., "FPGA Based High Performance Double-Precision Matrix Multiplication", int J Parallel Prog, 38(3-4), (2010), 322-338.

San, Ismail, et al., "Application-Specific Memory Access by Prefetching via High Level Synthesis", ACCSE 2018 : The Third International Conference on Advances in Computation, Communications and Services, (2018), 30-35.

Zhang, Zhekai, et al., "SpArch: Efficient Architecture for Sparse Matrix Multiplication", The 26th IEEE International Symposium on High-Performance Computer Architecture (HPCA 2020), arXiv:2002.08947v1 [cs.AR], (Feb. 20, 2020), 15 pgs.

* cited by examiner

FETCH CYCLE 1: A00, A01, A02, A03, B00, B10, B20, B30
COMPUTE CYCLE 1: A00*B00+A01*B10+A02*B20+A03*B30

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

| B00 | B01 | B02 | B03 | B04 | B05 | B06 | B07 |
|-----|-----|-----|-----|-----|-----|-----|-----|
| B10 | B11 | B12 | B13 | B14 | B15 | B16 | B17 |
| B20 | B21 | B22 | B23 | B24 | B25 | B26 | B27 |
| B30 | B31 | B32 | B33 | B34 | B35 | B36 | B37 |
| B40 | B41 | B42 | B43 | B44 | B45 | B46 | B47 |
| B50 | B51 | B52 | B53 | B54 | B55 | B56 | B57 |
| B60 | B61 | B62 | B63 | B64 | B65 | B66 | B67 |
| B70 | B71 | B72 | B73 | B74 | B75 | B76 | B77 |

FIG. 1

FETCH CYCLE 2: FETCH A04, A05, A06, A07, B40, B50, B60, B70
COMPUTE CYCLE 2: A04*B40+A05*B50+A06*B60+A07*B70 AND ADD TO CYCLE 1 RESULT TO COMPUTE Y00

| A00 | A01 | A02 | A03 | A04 | A05 | A06 | A07 | B00 | B01 | B02 | B03 | B04 | B05 | B06 | B07 |
|---|---|---|---|---|---|---|---|---|---|---|---|---|---|---|---|
| A10 | A11 | A12 | A13 | A14 | A15 | A16 | A17 | B10 | B11 | B12 | B13 | B14 | B15 | B16 | B17 |
| A20 | A21 | A22 | A23 | A24 | A25 | A26 | A27 | B20 | B21 | B22 | B23 | B24 | B25 | B26 | B27 |
| A30 | A31 | A32 | A33 | A34 | A35 | A36 | A37 | B30 | B31 | B32 | B33 | B34 | B35 | B36 | B37 |
| A40 | A41 | A42 | A43 | A44 | A45 | A46 | A47 | B40 | B41 | B42 | B43 | B44 | B45 | B46 | B47 |
| A50 | A51 | A52 | A53 | A54 | A55 | A56 | A57 | B50 | B51 | B52 | B53 | B54 | B55 | B56 | B57 |
| A60 | A61 | A62 | A63 | A64 | A65 | A66 | A67 | B60 | B61 | B62 | B63 | B64 | B65 | B66 | B67 |
| A70 | A71 | A72 | A73 | A74 | A75 | A76 | A77 | B70 | B71 | B72 | B73 | B74 | B75 | B76 | B77 |

FIG. 2

FETCH CYCLE 3: FETCH A00, A01, A02, A03, B01, B11, B21, B31
COMPUTE CYCLE 3: COMPUTE A00*B01+A01*B11+A02*B21+A03*B31

FIG. 3

FETCH CYCLE 4: FETCH A04, A05, A06, A07, B41, B51, B61, B71
COMPUTE CYCLE 4: A04*B41+A05*B51+A06*B61+A07*B71 AND ADD TO RESULT OF CYCLE 3 TO COMPUTE Y01

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

| B00 | B01 | B02 | B03 | B04 | B05 | B06 | B07 |
|-----|-----|-----|-----|-----|-----|-----|-----|
| B10 | B11 | B12 | B13 | B14 | B15 | B16 | B17 |
| B20 | B21 | B22 | B23 | B24 | B25 | B26 | B27 |
| B30 | B31 | B32 | B33 | B34 | B35 | B36 | B37 |
| B40 | B41 | B42 | B43 | B44 | B45 | B46 | B47 |
| B50 | B51 | B52 | B53 | B54 | B55 | B56 | B57 |
| B60 | B61 | B62 | B63 | B64 | B65 | B66 | B67 |
| B70 | B71 | B72 | B73 | B74 | B75 | B76 | B77 |

FIG. 4

FETCH CYCLE 0-3: PRE-FETCH A00, A10, A20, A30 FROM A MATRIX AND STORE IN R BUFFER [3:0]
COMPUTE CYCLE 0-3: IDLE

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

⇒

R BUFFER

| A00 | A10 | A20 | A30 |
|-----|-----|-----|-----|

FIG. 7

FETCH CYCLE 4: PREFETCH A01 INTO S BUFFER [0] AND FETCH B00 FROM B MATRIX

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

⇒

S BUFFER

| A01 |
|-----|
|     |
|     |
|     |

FIG. 8

FETCH CYCLE 5: PREFETCH A11 INTO S BUFFER [1] AND FETCH B01 FROM B MATRIX

| A00 | A01 | A02 | A03 | A04 | A05 | A06 | A07 |
|-----|-----|-----|-----|-----|-----|-----|-----|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

S BUFFER

| A01 | A11 |
|-----|-----|

FIG. 10

FETCH CYCLE 6: PREFETCH A12 INTO S BUFFER [2] AND FETCH B02 FROM B MATRIX

| A00 | A01 | A02 | A03 | A04 | A05 | A06 | A07 |
|---|---|---|---|---|---|---|---|
| A10 | A11 | A12 | A13 | A14 | A15 | A16 | A17 |
| A20 | A21 | A22 | A23 | A24 | A25 | A26 | A27 |
| A30 | A31 | A32 | A33 | A34 | A35 | A36 | A37 |
| A40 | A41 | A42 | A43 | A44 | A45 | A46 | A47 |
| A50 | A51 | A52 | A53 | A54 | A55 | A56 | A57 |
| A60 | A61 | A62 | A63 | A64 | A65 | A66 | A67 |
| A70 | A71 | A72 | A73 | A74 | A75 | A76 | A77 |

S BUFFER

| A01 | A11 | A21 |
|---|---|---|

FIG. 12

| PPX BUFFER | | | |
|---|---|---|---|
| PPx00 = A00*B00+A01*B10 | PPx01 = A00*B01+A01*B11 | PPx02 = A00*B02+A01*B12 | PPx03 = A00*B03+A01*B13 |
| PPx10 = A10*B00+A11*B10 | PPx11 = A10*B01+A11*B11 | PPx12 = A10*B02+A11*B12 | PPx13 = A10*B03+A11*B13 |
| PPx20 = A20*B00+A21*B10 | PPx21 = A20*B01+A21*B11 | PPx22 = A20*B02+A21*B12 | PPx23 = A20*B03+A21*B13 |
| PPx30 = A30*B00+A31*B10 | PPx31 = A30*B01+A31*B11 | PPx32 = A30*B02+A31*B12 | PPx33 = A30*B03+A31*B13 |

FIG. 16

PPX BUFFER

| $PPx00 = \sum_{k=0}^{7} A0k * Bk0$ | $PPx01 = \sum_{k=0}^{7} A0k * Bk1$ | $PPx02 = \sum_{k=0}^{7} A0k * Bk2$ | $PPx03 = \sum_{k=0}^{7} A0k * Bk3$ |
|---|---|---|---|
| $PPx10 = \sum_{k=0}^{7} A1k * Bk0$ | $PPx11 = \sum_{k=0}^{7} A1k * Bk1$ | $PPx12 = \sum_{k=0}^{7} A1k * Bk2$ | $PPx13 = \sum_{k=0}^{7} A1k * Bk3$ |
| $PPx20 = \sum_{k=0}^{7} A2k * Bk0$ | $PPx21 = \sum_{k=0}^{7} A2k * Bk1$ | $PPx22 = \sum_{k=0}^{7} A2k * Bk2$ | $PPx23 = \sum_{k=0}^{7} A2k * Bk3$ |
| $PPx30 = \sum_{k=0}^{7} A3k * Bk0$ | $PPx31 = \sum_{k=0}^{7} A3k * Bk1$ | $PPx32 = \sum_{k=0}^{7} A3k * Bk2$ | $PPx33 = \sum_{k=0}^{7} A3k * Bk3$ |

Y MATRIX

| Y00 | Y01 | Y02 | Y03 | Y04 | Y05 | Y06 | Y07 |
|---|---|---|---|---|---|---|---|
| Y10 | Y11 | Y12 | Y13 | Y14 | Y15 | Y16 | Y17 |
| Y20 | Y21 | Y22 | Y23 | Y24 | Y25 | Y26 | Y27 |
| Y30 | Y31 | Y32 | Y33 | Y34 | Y35 | Y36 | Y37 |
| Y40 | Y41 | Y42 | Y43 | Y44 | Y45 | Y46 | Y47 |
| Y50 | Y51 | Y52 | Y53 | Y54 | Y55 | Y56 | Y57 |
| Y60 | Y61 | Y62 | Y63 | Y64 | Y65 | Y66 | Y67 |
| Y70 | Y71 | Y72 | Y73 | Y74 | Y75 | Y76 | Y77 |

FIG. 17

FETCH CYCLE 0-3: PREFETCH B00, B01, B02, B03 FROM B MATRIX AND STORE IN R BUFFER [3:0]
COMPUTE CYCLE 0-3: IDLE

| B00 | B01 | B02 | B03 | B04 | B05 | B06 | B07 |
|-----|-----|-----|-----|-----|-----|-----|-----|
| B10 | B11 | B12 | B13 | B14 | B15 | B16 | B17 |
| B20 | B21 | B22 | B23 | B24 | B25 | B26 | B27 |
| B30 | B31 | B32 | B33 | B34 | B35 | B36 | B37 |
| B40 | B41 | B42 | B43 | B44 | B45 | B46 | B47 |
| B50 | B51 | B52 | B53 | B54 | B55 | B56 | B57 |
| B60 | B61 | B62 | B63 | B64 | B65 | B66 | B67 |
| B70 | B71 | B72 | B73 | B74 | B75 | B76 | B77 |

R BUFFER: | B00 | B01 | B02 | B03 |

FIG. 19

FETCH CYCLE 4: PREFETCH B10 INTO S BUFFER [0] AND FETCH A00 FROM A MATRIX

| B00 | B01 | B02 | B03 | B04 | B05 | B06 | B07 |
|-----|-----|-----|-----|-----|-----|-----|-----|
| B10 | B11 | B12 | B13 | B14 | B15 | B16 | B17 |
| B20 | B21 | B22 | B23 | B24 | B25 | B26 | B27 |
| B30 | B31 | B32 | B33 | B34 | B35 | B36 | B37 |
| B40 | B41 | B42 | B43 | B44 | B45 | B46 | B47 |
| B50 | B51 | B52 | B53 | B54 | B55 | B56 | B57 |
| B60 | B61 | B62 | B63 | B64 | B65 | B66 | B67 |
| B70 | B71 | B72 | B73 | B74 | B75 | B76 | B77 |

R BUFFER: | B10 | | | |

PARALLEL MATRIX MULTIPLICATION TECHNIQUE OPTIMIZED FOR MEMORY FETCHES

FIELD OF THE DISCLOSURE

This document relates to circuits and techniques for performing matrix multiplication of two matrices.

BACKGROUND

Matrix multiplication is a fundamental operation in many algorithms. For example, matrix multiplication maybe used in an algorithm used by transceivers to determine spatial correlation of a wireless signal's spatial direction and the average received signal gain.

To multiply an M*N matrix with an N*P matrix (where M, N, and P are positive integers), M*N*P multiplications need to be performed. Most processors support only one or sometimes two multiplications per cycle. This means that matrix multiplication consumes significant processing time and in certain cases is inefficient. To counteract the significant amount of processing time required, hardware accelerators are used for matrix multiplication. A hardware accelerator for matrix multiplication may multiply some of the matrix elements simultaneously or in parallel. However, this results in needing multiple fetches from memory to perform one cycle of multiplication. Loading this increased amount of data from memory can lead to bottle necks in the input/output (IO) between the processor and the memory storing the matrices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 1-4 illustrate an example of matrix multiplication.

FIGS. 7-17 illustrate an example of multiplying matrices using parallel multiplication operations.

FIGS. 19-21 illustrate another example of multiplying matrices using parallel multiplication operations.

DETAILED DESCRIPTION

Figure 5:
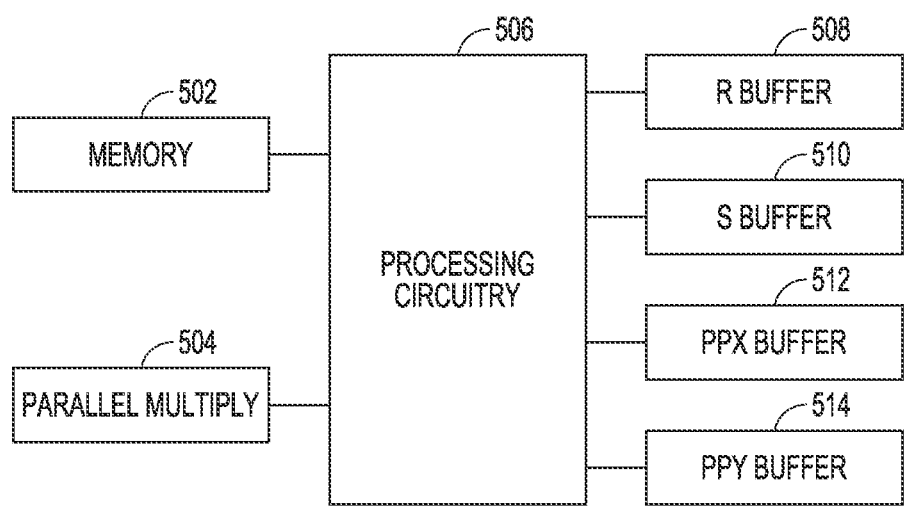
FIG. 5 is a block diagram of portions of a matrix multiplication circuit that performs multiplication of two matrices.

To increase the speed of matrix multiplication by computing systems, some systems include hardware accelerators. Hardware accelerators can include dedicated parallel multiply circuits that perform multiplication operations on multiple matrix elements in parallel. As explained previously herein, M*N*P multiplications need to be performed to multiply an M*N matrix with an N*P matrix. Instead of multiplying one element of the M*N matrix by one element of the N*P matrix each cycle, a parallel multiply circuit multiplies Q elements of the matrices in parallel simultaneously, with Q being a positive integer less than or equal to M, N, and P.

FIGS. 1-4 illustrate an example scenario of multiplying 8*8 matrix A with 8*8 matrix B to obtain 8*8 matrix Y (Y=A*B). To keep the example simple, the matrices are multiplied using a parallel multiply circuit that performs four parallel multiplies every cycle (Q=4). In an actual implantation, Q would be a larger number (e.g., Q=16 or greater). In the example of FIGS. 1-4, each parallel multiplication operation requires two cycles; a fetch cycle to retrieve values of the matrices and a compute cycle that outputs the four products in parallel.

FIG. 1 is an example of the first multiplication. The first fetch cycle (Fetch Cycle 1) loads matrix elements A00, A01, A02, and A03 from the first row of matrix A, and loads matrix elements B00, B10, B20, and B30 from the first column of matrix B. Compute Cycle 1 computes partial product A00*B00+A01*B10+A02*B20+A03*B30.

FIG. 2 is an example of the second multiplication. Fetch Cycle 2 loads matrix elements A04, A05, A06, and A07 from the first row of matrix A, and loads matrix elements B40, B50, B60, and B70 from the first column of matrix B. Compute Cycle 2 computes partial product A04*B40+A05*B50+A06*B60+A07*B70, and adds this to the result of the first compute cycle to complete element Y00 of the Y matrix.

Figure 3:
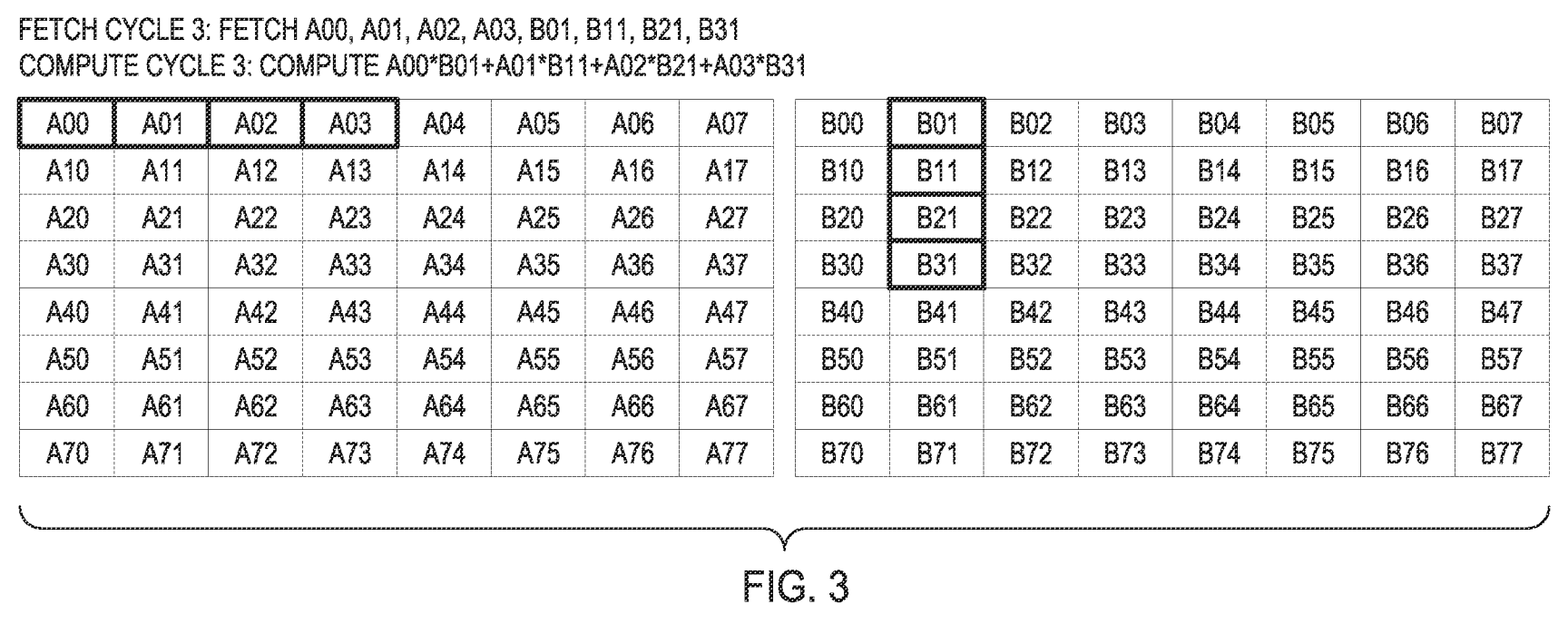

FIG. 3 is an example of the third multiplication. Fetch Cycle 3 loads matrix elements A00, A01, A02, and A03 from the first row of matrix A, and loads matrix elements B01, B11, B21, and B31 from the second column of matrix B. Compute Cycle 3 computes partial product A00*B01+A01*B11+A02*B21+A03*B31.

FIG. 4 is an example of the fourth multiplication. Fetch Cycle 2 loads matrix elements A04, A05, A06, and A07 from the first row of matrix A, and loads matrix elements B41, B51, B61, and B71 from the second column of matrix B. Compute Cycle 2 computes partial product A04*B41+A05*B51+A06*B61+A07*B71, and adds this to the result of the third compute cycle to complete element Y01 of the Y matrix. The fetch and compute cycles continue until the last element (Y77) of the Y matrix is computed.

In the example of FIGS. 1-4, four different elements are fetched from each matrix in memory for a total of eight memory reads (2*Q) in every fetch cycle of the parallel multiply. This access of the multiple matrix elements every fetch cycle of the multiplications may cause an IO bottleneck. One approach to solve this IO bottleneck is to split the matrices across multiple banks of memories which can be read in parallel. As Q increases (e.g., Q≥16) this approach can become impractical. Also, the power used for memory reads dominates over the power used for the multiplication, and hence overall power starts increasing rapidly with increasing Q.

FIG. 5 is a block diagram of portions of a matrix multiplication circuit 500 that performs multiplication of two matrices. The circuit reduces the number of memory fetches needed to one from each matrix per fetch cycle of the parallel multiply.

The circuit 500 includes a memory storage device 502, a parallel multiply circuit 504, and processing circuitry 506. The memory storage device 502 contains memory circuitry to store the two matrices that are to be multiplied. The parallel multiply circuit 504 simultaneously performs a count of multiplies in one parallel multiplication operation. The processing circuitry 506 is in communication with the memory storage device and parallel multiply circuit 504. In certain examples, the parallel multiply circuit 504 is integral to the processing circuitry 506.

The matrix multiplication circuit 500 also includes two prefetch buffer circuits, R BUFFER 508, and S BUFFER 510. The prefetch buffers may be separate from the memory circuitry of the memory storage device 502. Each of the prefetch buffer circuits has a storage array dimension corresponding to the count of multiplies in the parallel multiplication operation. For example, if the parallel multiply circuit 504 multiplies four matrix elements at one time (Q=4), the prefetch buffer circuits can be four-by-one (4×1) storage arrays. If the parallel multiply circuit 504 multiplies sixteen matrix elements at one time (Q=16), the prefetch buffer circuits can be sixteen-by-one (16×1) storage arrays. The matrix multiplication circuit 500 also includes a partial products buffer circuit 512 (PPX BUFFER) to store partial products during the matrix multiplication. The partial products buffer has two array dimensions, each array dimension corresponding to the count of multiplies in the parallel multiplication operation. For example, if Q=4 PPX BUFFER can be a four-by-four (4×4) storage array.

Figure 6:
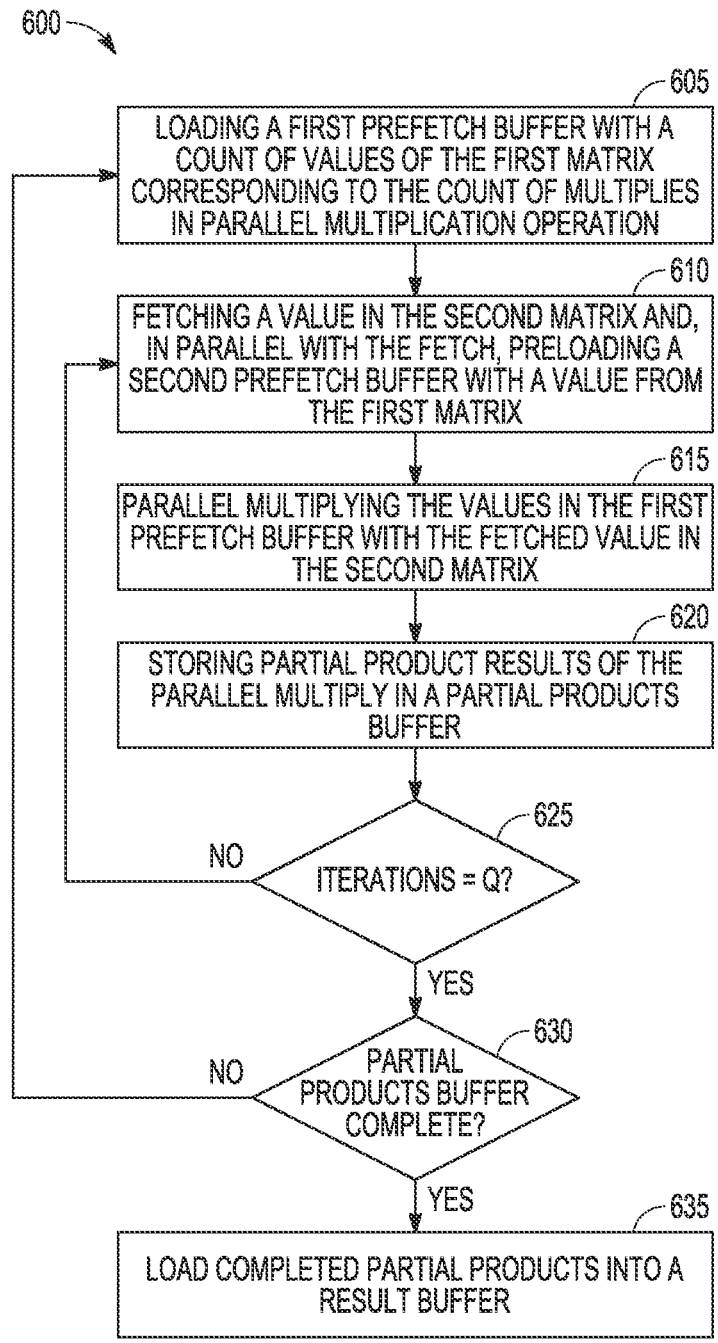
FIG. 6 is a flow diagram of a method of calculating partial products for matrix multiplication of two matrices using parallel multiplication operations.

FIG. 6 is a flow diagram of a method 600 of calculating partial products for matrix multiplication of two matrices using parallel multiplication operations. The method 600 can be performed using the matrix multiplication circuit 500 of FIG. 5. The method 600 may begin by the processing circuitry 506 of FIG. 5 allocating the prefetch buffer circuits (508, 510) and the partial products buffer circuit (512) if necessary.

At block 605, the processing circuitry 506 loads the prefetch buffer R BUFFER with a count of values of the first matrix. The count of values corresponds to the number or count of multiplies (Q) in the parallel multiplication operation. For example, if the parallel multiply circuit 504 multiplies four matrix elements at one time (Q=4), the processing circuitry 506 loads the first prefetch buffer circuit 508 with four values of the first matrix into the prefetch buffer circuit 508.

Blocks 610, 615, and 620 are performed for a first count of iterations corresponding to the count of multiplies in the parallel multiplication operation. At block 605, the processing circuitry 506 fetches a value in the second matrix from the memory circuitry. In parallel with the fetch from the second matrix, the processing circuitry 506 preloads the second prefetch buffer S BUFFER with a value from the first matrix. At block 610, the matrix values in the R BUFFER are parallel multiplied with the value fetched from the second matrix. At block 615, the partial products for the parallel multiply are stored in PPX BUFFER. If there are previous partial products results in the buffer, the current partial product result is added to the previously stored partial product results.

When the iterations are completed at block 625, the method returns to prefetching values for the R BUFFER while the matrix values stored in the S BUFFER are multiplied. At block 630, the method continues until the partial products are completed. At block 635, the partial products buffer can be loaded into a result buffer that stores the Y matrix. The matrix multiplication circuit 500 can include a second partial products buffer circuit 514 (PPY BUFFER). The partial products buffers can be used alternately, so that the next partial products can be stored in PPY BUFFER while the contents of PPY BUFFER are read out to the result array.

FIGS. 7-17 illustrate an example of an approach of multiplying matrices that reduces the IO bottleneck associated with parallel multiplication. The example multiplies a matrix A with a matrix B to obtain matrix Y (Y=A*B). The multiplication can be performed using the matrix multiplication circuit in the example of FIG. 5. The example illustrates a relatively simple case where the matrices are 8×8 matrices (or M=N=P=8) and the parallel multiply circuit 504 multiples four matrix elements at one time (or Q=4). The prefetch buffers are 4×1 buffers and the partial products buffers are 4×4 buffers. To reduce 10 bottlenecks at the memory, elements of matrix A are prefetched column-wise and then multiplied with elements of the B matrix.

FIG. 7 shows the first fetch and compute cycles 0-3. The first four fetch cycles load the prefetch buffer R BUFFER with the first four elements (A00, A10, A20, A30) in the first column of matrix A for the first parallel multiply. The first four compute cycles are idle while the prefetch buffer is being loaded.

Figure 9:

FIG. 8 shows the next fetch cycle Fetch Cycle 4. The first element of the second column of matrix A (A01) is prefetched and loaded in prefetch buffer S BUFFER at the same that the first element of matrix B (BOO) is fetched from memory. FIG. 9 shows the compute cycle (Compute Cycle 4) that follows Fetch Cycle 4. The elements in R BUFFER are each multiplied with BOO in parallel and the results are stored in the first column of partial products buffer PPX BUFFER.

The fetch and compute cycles are repeated for the first four elements of the first row of matrix B (B00, B01, B02, B03). The four iterations of fetch and compute cycles correspond to the size of the parallel multiplier or the number of multiplies executed per cycle (i.e., Q), which is also the number of prefetches needed to load prefetch buffer S BUFFER.

Figure 11:

FIG. 10 shows Fetch Cycle 5 in which the second element of the second column of the A matrix (A11) is loaded in the S BUFFER in parallel with the second element of the first row of matrix B (B01) being fetched. FIG. 11 shows Compute Cycle 5 in which each of the elements of R BUFFER is multiplied by B01 simultaneously and the results are stored in the second column of PPX BUFFER.

Figure 13:

FIG. 12 shows Fetch Cycle 6 in which the third element of the second column of the A matrix (A21) is loaded in the S BUFFER while the third element of the first row of matrix B (B02) is being fetched. FIG. 13 shows Compute Cycle 6 in which each of the elements of R BUFFER is multiplied by B02 and the results are stored in the third column of PPX BUFFER.

Figure 14:
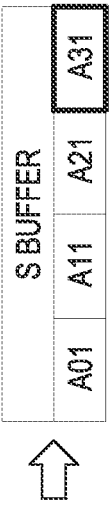
Figure 15:

FIG. 14 shows Fetch Cycle 7 in which the fourth element of the second column of the A matrix (A31) is loaded in the S BUFFER while the third element of the first row of matrix B (B02) is being fetched. FIG. 15 shows Compute Cycle 7 in which each of the elements of R BUFFER is multiplied by B03 and the results are stored in the fourth column of PPX BUFFER.

At the end of the four cycles (cycles 4-7) of loading and multiplying, prefetch buffer PPX BUFFER contains partial products resulting from multiplying the first four elements of the first column of matrix A stored in R BUFFER by the first four elements of the first row of matrix B. FIG. 16 shows the partial products at the end of cycle 11. The results of cycles 8-11 are added to the results of cycles 4-7. Prefetch buffer S BUFFER is now preloaded with the first four elements of the second column of matrix A (A01, A11, A21, A31). The process now changes to multiplying each of the four elements of the S BUFFER by the first four elements of the second row of matrix B (B10, B11, B12, B13) in the next four fetch and compute cycles (cycles 8-11 with four multiplications in parallel every cycle) while the R BUFFER is preloaded with the first four elements of the third column of matrix A (A02, A12, A22, A32).

In Fetch Cycles 12-15, prefetch buffer S BUFFER is preloaded with the first four elements of the fourth column of matrix A (A03, A13, A23, A33) one per fetch cycle while the first four elements of the third row of the B matrix (B20, B21, B22, B23) are fetched one at a time for multiplying with the four elements in prefetch buffer R BUFFER in compute cycles 12-15 (four multiplications in parallel every cycle).

In Fetch Cycles 16-19, prefetch buffer R BUFFER is preloaded with the first four elements of the fifth column of matrix A (A04, A14, A24, A34) one per fetch cycle while the first four elements of the fourth row of the B matrix (B30, B31, B32, B33) are fetched one at a time for multiplying with the four elements in prefetch buffer S BUFFER in parallel in compute cycles 16-19.

In Fetch Cycles 20-23, prefetch buffer S BUFFER is preloaded with the first four elements of the sixth column of matrix A (A05, A15, A25, A35) one per fetch cycle while the first four elements of the fifth row of the B matrix (B40, B41, B42, B43) are fetched one at a time for multiplying with the four elements in prefetch buffer R BUFFER in parallel in compute cycles 20-23.

In Fetch Cycles 24-27, prefetch buffer R BUFFER is preloaded with the first four elements of the seventh column of matrix A (A06, A16, A26, A36) one per fetch cycle while the first four elements of the sixth row of the B matrix (B50, B51, B52, B53) are fetched one at a time for multiplying with the four elements in prefetch buffer S BUFFER in parallel in compute cycles 24-27.

In Fetch Cycles 28-31, prefetch buffer S BUFFER is preloaded with the first four elements of the eighth column of matrix A (A07, A17, A27, A37) one per fetch cycle while the first four elements of the seventh row of the B matrix (B60, B61, B62, B63) are fetched one at a time for multiplying with the four elements in prefetch buffer R BUFFER in parallel in compute cycles 28-31.

In Fetch Cycles 32-35, prefetch buffer R BUFFER is preloaded with four elements of matrix A one per fetch cycle while the first four elements of the eighth row of the B matrix (B70, B71, B72, B73) are fetched one at a time for multiplying with the four elements in prefetch buffer S BUFFER in parallel in compute cycles 32-35. At the end of 36 fetch and compute cycles partial products buffer PPX BUFFER contains 16 complete results for the first Q*Q subsection of the matrix Y. The 16 results can be written out to the Y matrix.

FIG. 17 shows the partial products buffer PPX BUFFER with the 16 products corresponding to elements Y00 to Y33 of matrix Y. During fetch cycles 32-35, the prefetch buffer R BUFFER can be preloaded with the next subsection of matrix A to be multiplied (e.g., A04, A14, A24, A34) by an element of the next subsection of the B matrix (e.g., B04).

The above steps are repeated in fetch cycles 36-67 and compute cycles 36-67 by fetching appropriate data from A and B matrix to compute the next Q*Q subsection of the Y matrix. When the partial products buffer PPX BUFFER is filled, the partial products for that subsection can be written to a result buffer for the Y matrix. Because partial products buffer PPX BUFFER may still be being transferred out to Y matrix when the next cycles of multiplication begin, partial products buffer PPY BUFFER can be used to store the intermediate partial product results. The procedure is repeated to compute every Q*Q elements of the Y matrix, alternating between PPX BUFFER and PPY BUFFER to store the results. After 128 fetch and compute cycles (cycles 4-131) plus the first four fetch cycles and idle compute cycles (cycles 0-3) the elements of the Y matrix are calculated. Note that 512 multiplies were completed in the 132 cycles by multiplying four elements in parallel during each compute cycle 4-131 except for the first four idle compute cycles 0-3. Other implementations can include multiplying more elements (e.g., 16 or more elements) in parallel and multiplying larger matrices.

Figure 18A:
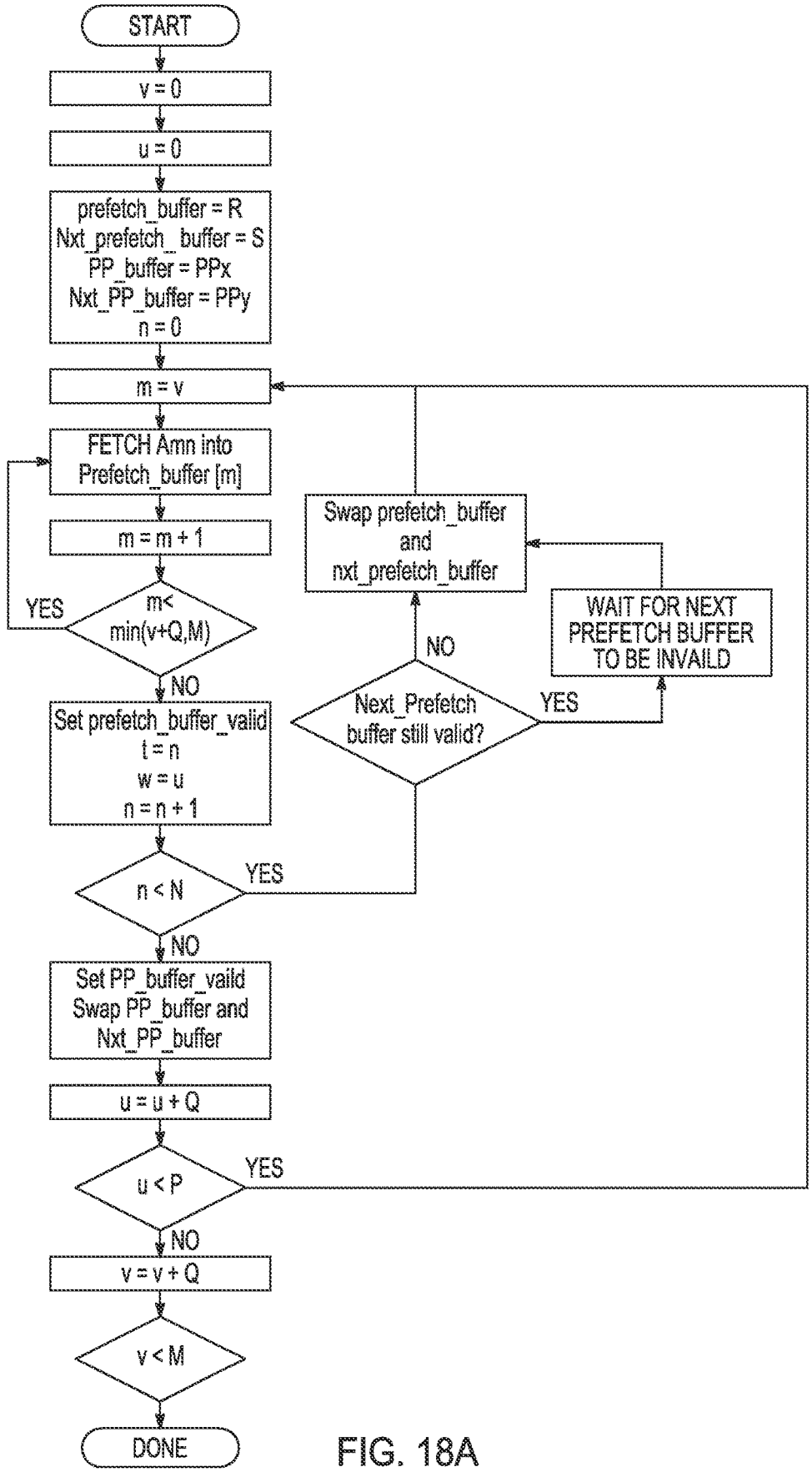
FIGS. 18A and 18B are flow diagrams containing an example of pseudocode for the example of multiplying matrices illustrated in FIGS. 7-17.
Figure 18B:
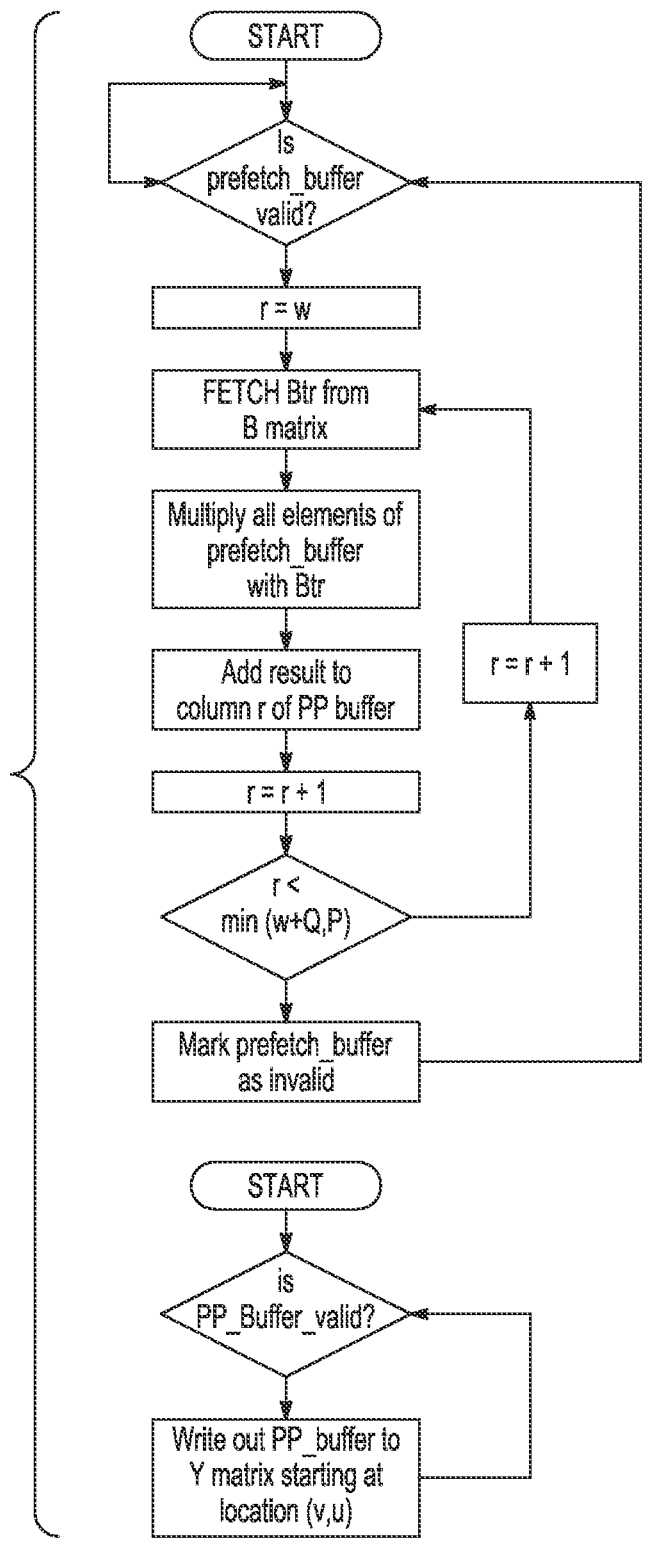

FIGS. 18A and 18B are flow diagrams containing pseudocode for the approach of multiplying matrices described in FIGS. 7-17. FIG. 18A is pseudocode for the Fetch Cycles. FIG. 18B is pseudocode for the Compute Cycles and logic for transferring partial products from the partial products buffers to the Y matrix.

As explained previously herein, in the approach of the examples of FIGS. 7-17, elements of matrix A are prefetched column-wise and then parallel multiplied with elements of the B matrix. In a variant of the approach, elements of the B matrix are prefetched row-wise and then multiplied with elements of matrix A in parallel.

Figure 21:

FIGS. 19-21 show an example of the alternate approach. FIG. 19 shows the first fetch and compute cycles 0-3. The first four fetch cycles load the prefetch buffer R BUFFER with the first four elements (B00, B01, B02, B03) in the first row of matrix B for the first parallel multiply. The first four compute cycles are idle while the prefetch buffer is being loaded. Because elements are prefetched row-wise from matrix B rather than column-wise from matrix A as in the example of FIGS. 7-17, the approach in the example of FIGS. 19-21 can be referred to as a row-wise approach and the approach in the example of FIGS. 7-17 can be referred to as column-wise approach.

FIG. 20 shows Fetch Cycle 4. The first element of the second row of matrix B (B10) is prefetched and loaded in prefetch buffer S BUFFER at the same that the first element of matrix A (A00) is fetched from memory. FIG. 21 shows Compute Cycle 4 that follows Fetch Cycle 4. The elements in R BUFFER are each multiplied with A00 in parallel and the results are stored in the first row of partial products buffer PPX BUFFER.

In Fetch Cycles 5-7, elements of the first column of matrix A are fetched from memory and each element is multiplied in parallel by the elements in prefetch buffer R BUFFER. Also, during Fetch Cycles 5-7 second row elements B11, B12, and B13 are prefetched from the B matrix and stored in prefetch buffer S BUFFER. As in the previous approach, the process of fetching, prefetching, and multiplying is repeated every four cycles. At the end of cycle 35, the partial products buffer PPX Buffer contains the Q*QA subsection as in the previous approach. The process continues with determining the other subsections until all the elements of the Y matrix are calculated.

Figure 22A:
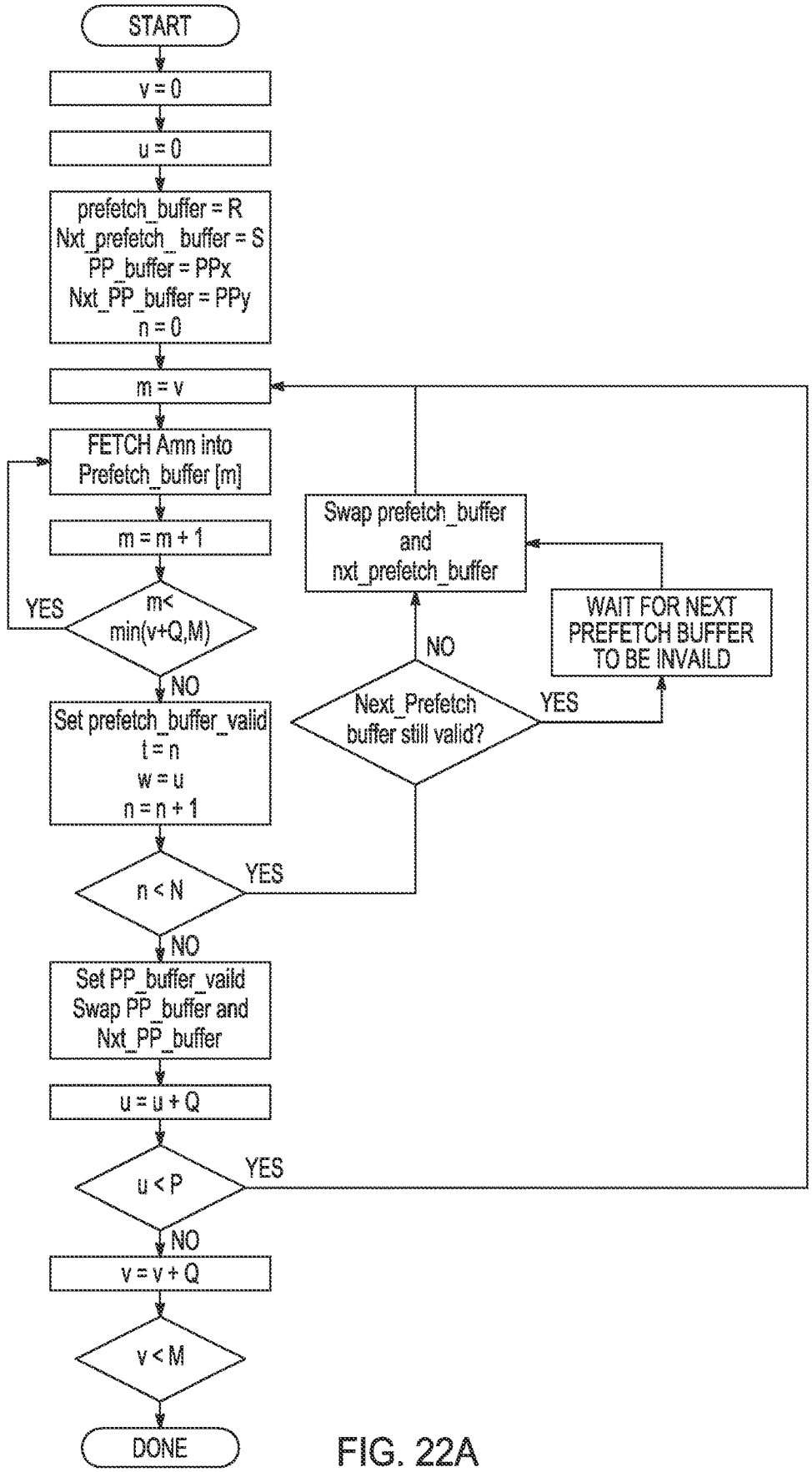
FIGS. 22A and 22B are flow diagrams containing pseudocode for the example of multiplying matrices illustrated in FIGS. 19-21.
Figure 22B:
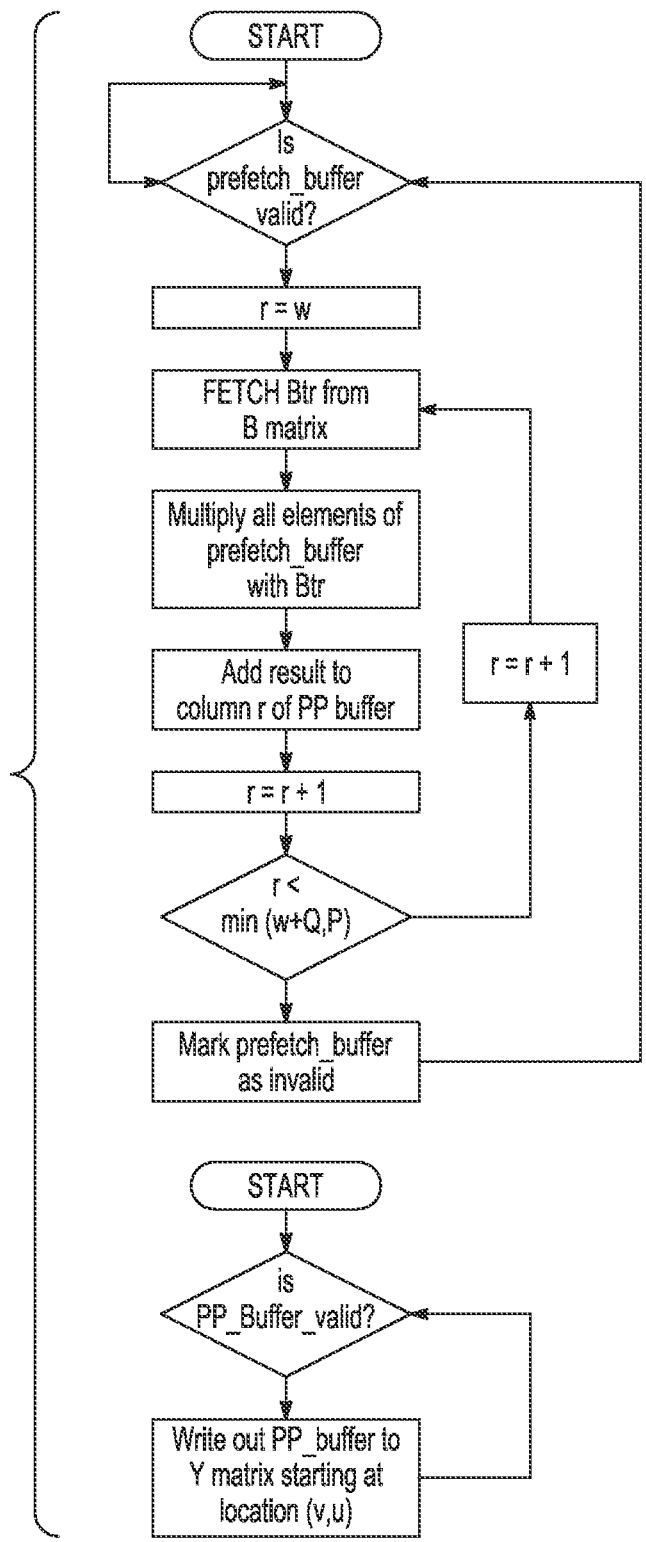

FIGS. 22A and 22B are flow diagrams containing pseudocode for the alternate approach of multiplying matrices. FIG. 22A shows pseudocode for the Fetch Cycles. FIG. 22B shows pseudocode for the Compute Cycles and logic for transferring partial products from the partial products buffers to the Y matrix.

The matrix multiplication approaches described previously herein reduce the number of fetches required from both of the matrices multiplied to just one fetch per cycle regardless of the count Q of parallel multiplies performed in one multiplication operation. The count Q should be less than the size of both of the matrices, or Q<min (M,P) when multiplying an M*N matrix with an N*P matrix. In the examples, M and P were multiples of Q. When Q does not evenly divide into M or P there would be "leftovers" in computing the Q*Q subsections of the Y matrix. The leftover subsections are less than the size of a Q*Q subsection and computing the products for these partial subsections is less efficient because either all of the multipliers of the multiplication circuit are not used or not enough data can be prefetched to keep the multiplication circuit busy every cycle.

Figure 23:
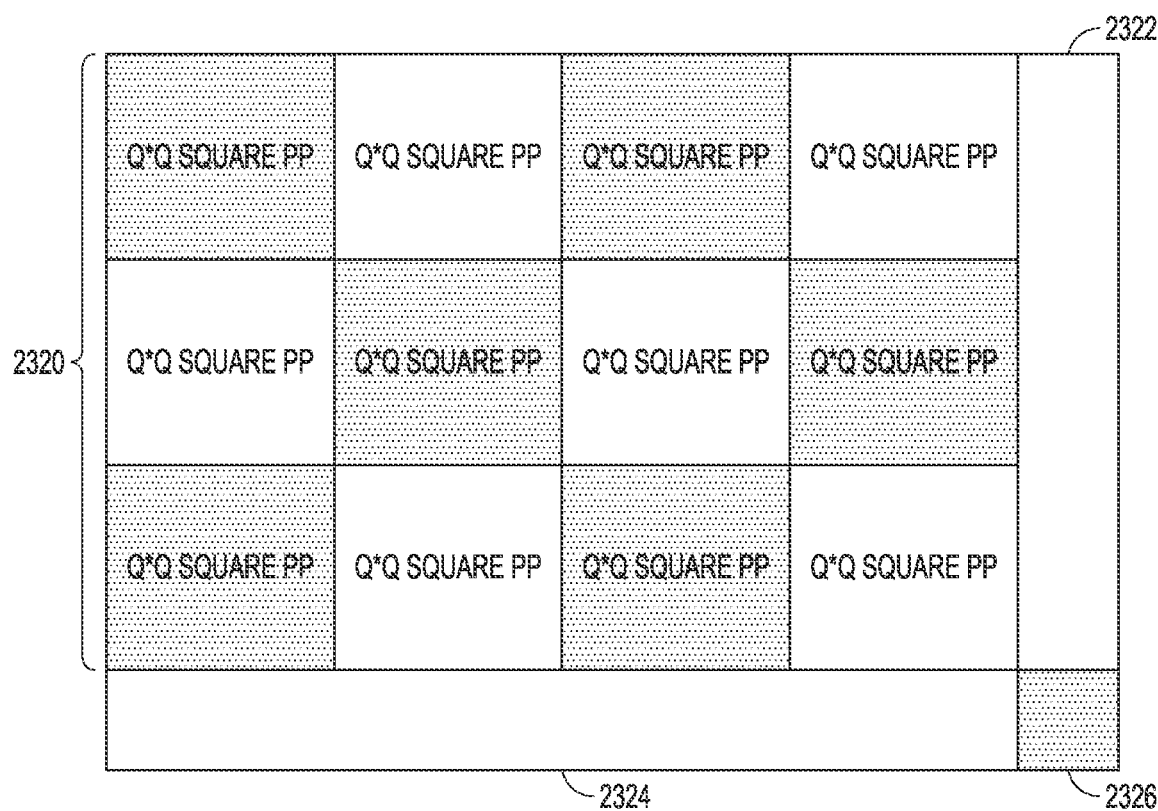
FIG. 23 illustrates a multiplication result matrix with leftover matrix subsections.

FIG. 23 illustrates the leftover subsections that occur when multiplying an M*N matrix and a N*P matrix and Q does not evenly divide into one or both of M and P. Region 2320 divides into twelve Q*Q subsections and the multiplication circuit with Q multiplies is used efficiently. Region 2322 includes leftover subsections when P is not a multiple of Q, region 2324 includes leftover subsections when M is not a multiple of Q, and region 2326 includes leftover subsections when both M and P are not multiples of Q.

To reduce the leftover subsections the size of the partial products buffer circuits can be increased by increasing the number of rows or columns. When P is not a multiple of Q, the number of columns of the second matrix (the N*P matrix) is not a multiple of the count of multiplies in the parallel multiplication operation. Leftover subsections can occur in regions 2322 and 2326 in FIG. 23. These leftover sections can be eliminated by increasing the number of columns in the partial products buffer circuits. When P is not a multiple of Q, processing circuitry may allocate partial products buffer circuits as a Q*2Q array (Q rows by 2Q columns) instead of a Q*Q array. This builds more partial products but reduces the number of memory fetches further. The same prefetch buffer size is used for more multiplications before it is discarded.

When M is not a multiple of Q, the number of rows of the first matrix (the M*N matrix) is not a multiple of the count of multiplies in the parallel multiplication operation. Leftover subsections can occur in regions 2324 and 2326 in FIG. 23. These leftover sections can be eliminated by increasing the number of rows in the partial products buffer circuits. When M is not a multiple of Q, processing circuitry (e.g., processing circuitry 506 in FIG. 5) may allocate partial products buffer circuits as a 2Q*Q array (2Q rows by Q columns). When both M and P are not multiples of Q, whichever of M or P has the greater remainder (which of MOD(M,Q) or MOD(P,Q) is greater) determines whether to use a partial products buffer of size 2Q*Q or size Q*2Q.

The processing circuitry 506 may perform an algorithm to allocate rows and columns for the partial products buffers (PPX BUFFER, PPY BUFFER) to best reduce the leftover sections. For example, when multiplying an M*N matrix and a N*P matrix using a multiplication circuit with Q parallel multiplies,

```
If MOD(M,Q) > MOD(P,Q)
    Select Partial Products Buffers with size 2Q*Q,
```

-continued

```
    Use row-wise prefetch,
Else
    Select Partial Products Buffers with size Q*2Q,
    Use column-wise prefetch.
```

Figure 24A:
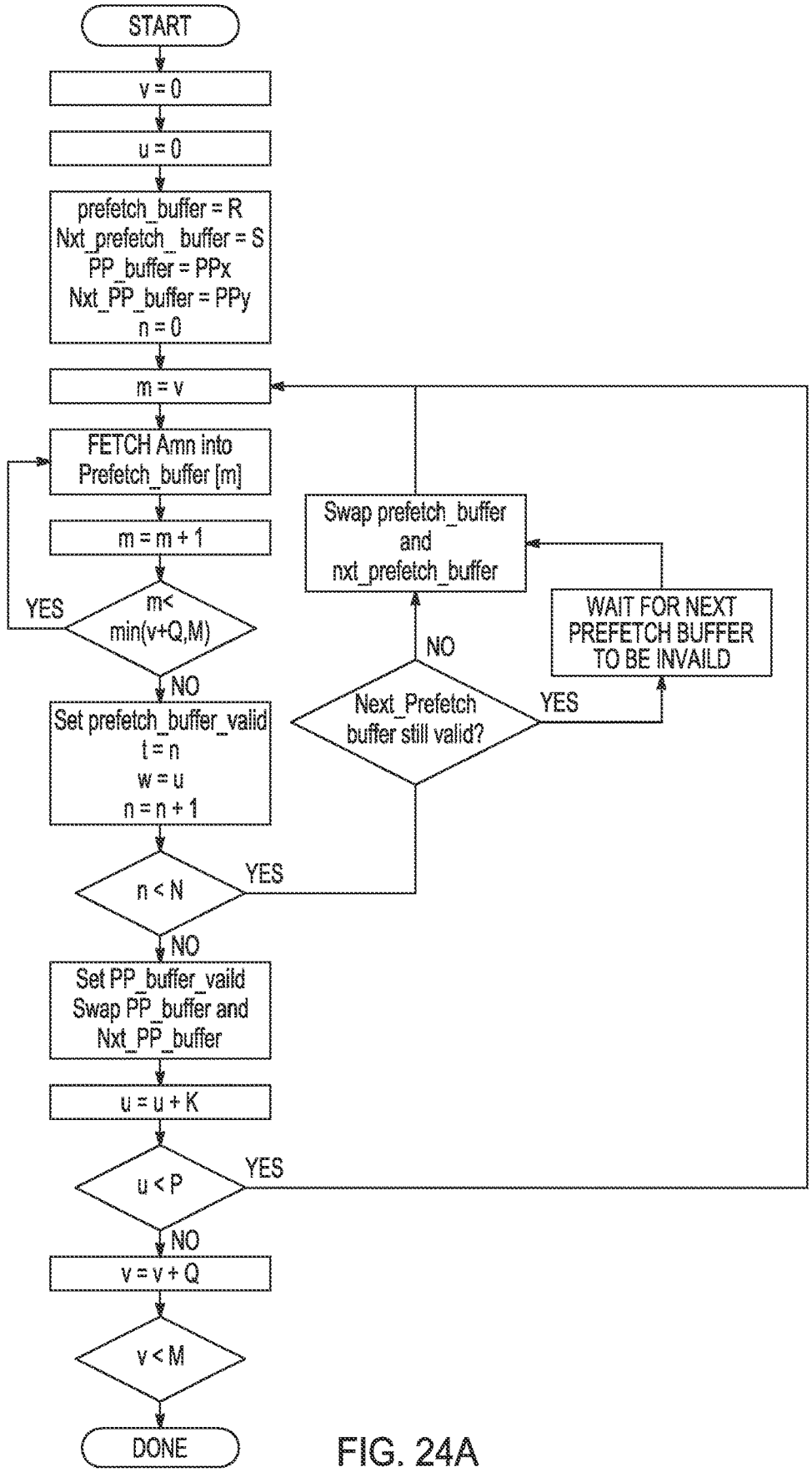
FIGS. 24A and 24B are flow diagrams containing another example of pseudocode for the example of multiplying matrices illustrated in FIGS. 7-17.
Figure 24B:
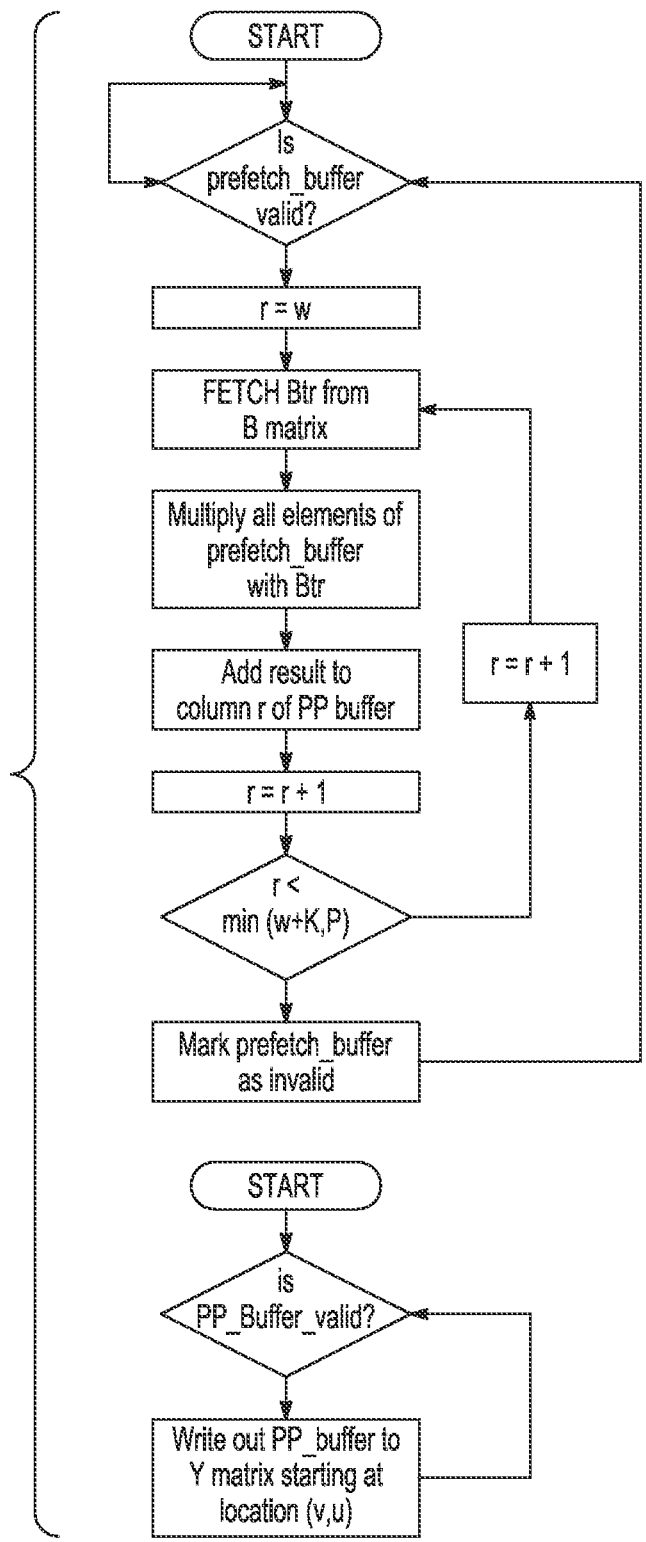

FIGS. 24A and 24B are flow diagrams containing pseudocode for the approach of the example of FIGS. 7-17 when MOD(P,Q)>MOD(M,Q). The partial products buffer size is Q*K instead of Q*Q, where K is an integer larger than Q (e.g., equal to Q+Q/2 or 2Q). FIG. 24A shows pseudocode for the Fetch Cycles. The prefetch in FIG. 24A is column-wise from matrix A. FIG. 24B shows pseudocode for the Compute Cycles and logic for transferring partial products from the partial products buffers to the Y matrix.

Figure 25A:
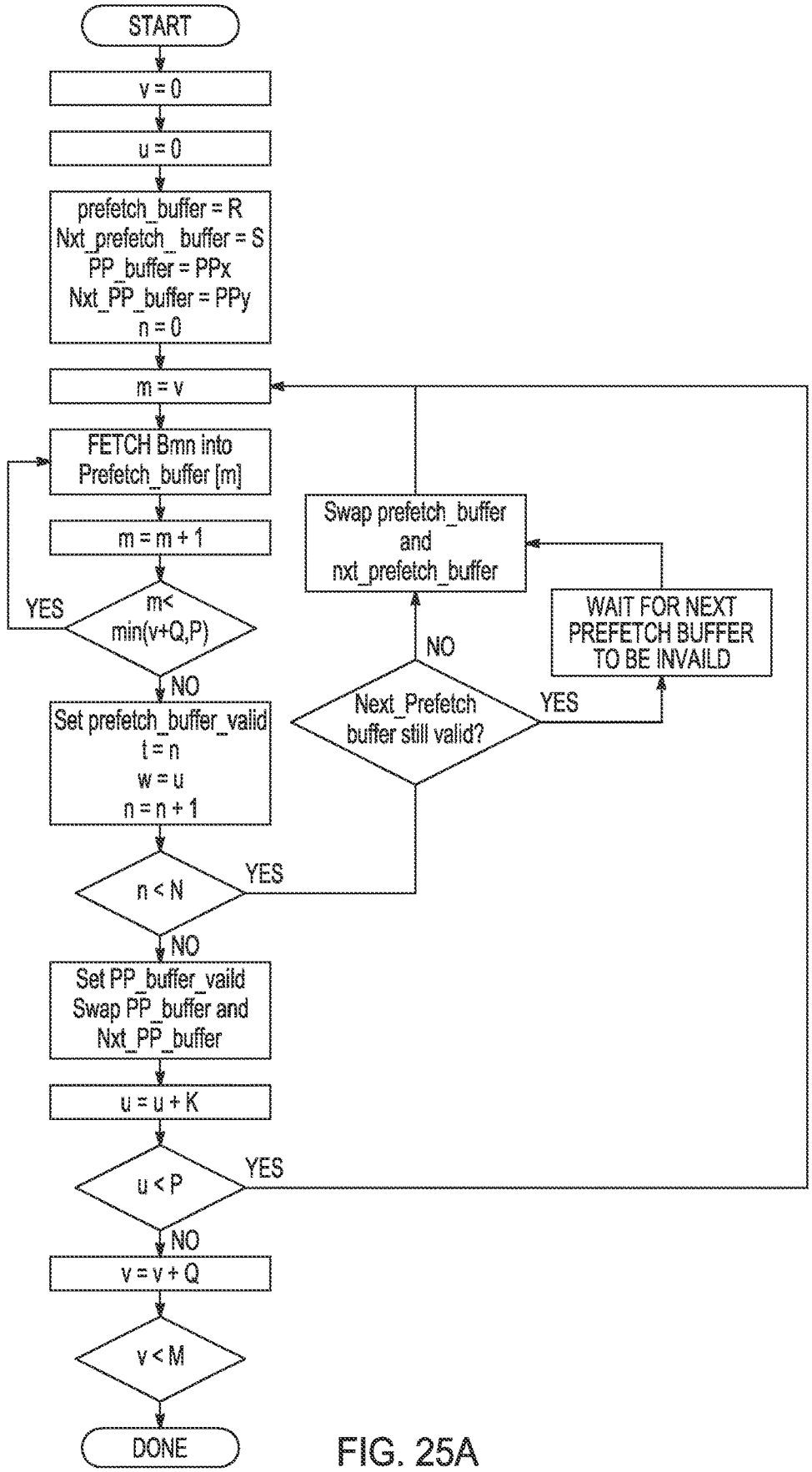
FIGS. 25A and 25B are flow diagrams containing another example of pseudocode for the approach of the example of illustrated in FIGS. 7-17.
Figure 25B:
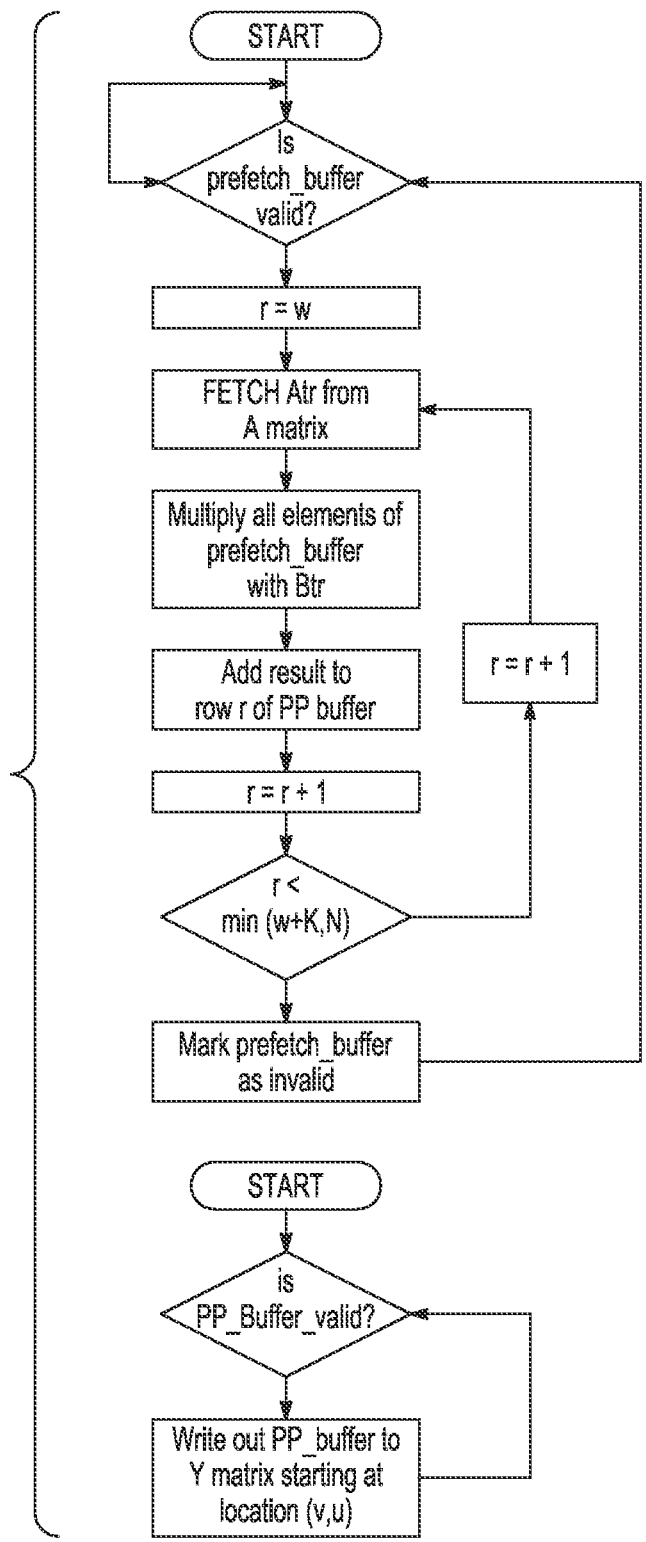

FIGS. 25A and 25B are flow diagrams containing pseudocode for the approach of the example of FIGS. 19-21 when MOD(M,Q)>MOD(P,Q). The partial products buffer size is K*Q instead of Q*Q. FIG. 25A shows pseudocode for the Fetch Cycles. The prefetch in FIG. 25A is row-wise from matrix B. FIG. 25B shows pseudocode for the Compute Cycles and logic for transferring partial products from the partial products buffers to the Y matrix.

The devices, systems and methods described herein provide matrix multiplication that reduces the IO bottleneck associated with memory access for parallel multiplication operations. The matrix multiplication approaches described herein reduce the number of memory reads to just one read from each matrix per cycle regardless of the count Q of parallel multiplies performed in one multiplication operation. Conventional techniques typically require 2*Q memory reads each cycle. Because the power used for memory reads dominates over the power used for multiplication, the techniques described herein can significantly reduce the power used for matrix multiply operations.

Additional Description and Aspects

A first Aspect (Aspect 1) includes subject matter (such as a multiplication circuit) comprising a memory storage device including memory circuitry to store a first matrix and a second matrix; processing circuitry in communication with the memory storage device; a parallel multiply circuit in communication with, or integral to, the processing circuitry and configured to simultaneously perform a count of multiplies in a parallel multiplication operation; first and second prefetch buffer circuits separate from memory circuitry of the memory storage device, each prefetch buffer circuit having a storage array dimension corresponding to the count of multiplies in the parallel multiplication operation; and a first partial products buffer circuit. The processing circuitry is configured to load the first prefetch buffer circuit with values from the first matrix, and for a first count of iterations corresponding to the count of multiplies: fetch a value of the second matrix and, in parallel with the fetch, preload the second prefetch buffer circuit with another value from the first matrix, initiate a parallel multiply of the fetched value of the second matrix and the values in the first prefetch buffer circuit, and store partial product results of the parallel multiply in the first partial products buffer circuit, including adding a current partial product result to a previously stored partial product result.

In Aspect 2, the subject matter of Aspect 1 optionally includes processing circuitry is configured to, for a second count of iterations corresponding to the count of multiplies: fetch another value in the second matrix and, in parallel with the fetch, preload the first prefetch buffer circuit with a value from the first matrix, parallel multiply the values preloaded in the second prefetch buffer circuit with the fetched other value in the second matrix, and store partial product results of the parallel multiply in the first partial products buffer circuit, including adding a current partial product result to a previously stored partial product result.

In Aspect 3, the subject matter of Aspect 2 optionally includes a second partial products buffer circuit, wherein the first and second partial products buffer circuits are separate from the memory circuitry of the memory storage device, and processing circuitry configured to continue the first and second counts of iterations and store and add the partial product results in the first partial products buffer circuit until the partial product results are completed product results of multiplication of the first and second matrices, transfer the completed product results from the first partial products buffer circuit to a product array in the memory storage device, and continue the first and second counts of iterations and store the partial product results in the second partial products buffer in parallel to the transferring.

In Aspect 4, the subject matter of Aspect 3 optionally includes the first and the second partial products buffer circuits each having first and second storage array dimensions corresponding to the count of multiplies in the parallel multiplication operation when both dimensions of the first matrix and the second matrix are multiples of the count of multiplies in the parallel multiplication operation.

In Aspect 5, the subject matter of Aspect 3 optionally includes the first and the second partial products buffer circuits each having a first storage array dimension corresponding to the count of multiplies in the parallel multiplication operation and a second storage array dimension greater than the count of multiplies in the parallel multiplication operation when at least one dimension of at least one of the first matrix or the second matrix is not a multiple of the count of multiplies in the parallel multiplication operation.

In Aspect 6, the subject matter of one or any combination of Aspects 1-5 optionally includes the first partial products buffer circuit being a two-dimensional storage array that includes a greater number of columns than a number of rows when a number of columns of the first matrix equals a number of rows of the second matrix and a number of columns of the second matrix is not a multiple of the count of multiplies in the parallel multiplication operation.

In Aspect 7, the subject matter of one or any combination of Aspects 1-5 optionally includes a first partial products buffer circuit being a two-dimensional storage array that includes a greater number of rows than a number of columns when a number of columns of the first matrix equals a number of rows of the second matrix and a number of rows of the first matrix is not a multiple of the count of multiplies in the parallel multiplication operation.

In Aspect 8, the subject matter of one or any combination of Aspects 1-7 optionally includes processing circuitry configured to read only one value from the second matrix and read only one value of the first matrix for each parallel multiplication operation initiated.

Aspect 9 includes subject matter (such as a method of matrix multiplication performed by a hardware processor) or can optionally be combined with one or any combination of Aspects 1-8 to include such subject matter, comprising allocating first and second prefetch buffer circuits separate from memory circuitry of the memory storage device, each prefetch buffer circuit having a storage array dimension corresponding to a count of multiplies performed simultaneously in a parallel multiplication operation, allocating a first partial products buffer circuit, loading the first prefetch buffer circuit with a count of values of the first matrix corresponding to the count of multiplies in the parallel multiplication operation, and for a first count of iterations corresponding to the count of multiplies in the parallel multiplication operation: fetching a value in the second matrix and, in parallel with the fetch, preloading the second prefetch buffer circuit with a value from the first matrix, parallel multiplying the values in the first prefetch buffer circuit with the fetched value in the second matrix, and storing partial product results of the parallel multiply in the first partial products buffer circuit, including adding a current partial product result to a previously stored partial product result.

In Aspect 10, the subject matter of Aspect 9 optionally includes, after the first count of iterations and for a second count of iterations corresponding to the count of multiplies in the parallel multiplication operation: fetching another value in the second matrix and, in parallel with the fetch, preloading the first prefetch buffer circuit with a value from the first matrix, parallel multiplying the values preloaded in the second prefetch buffer circuit with the fetched other value of the second matrix, and storing partial product results of the parallel multiply in the first partial products buffer circuit, including adding a current partial product result to a previously stored partial product result.

In Aspect 11, the subject matter of Aspect 10 optionally includes allocating a second partial products buffer circuit, wherein the first and second partial products buffer circuits are separate from the memory circuitry of the memory storage device, continuing the first and second counts of iterations and storing and adding the partial product results in the first partial products buffer circuit until the partial product results are completed product results of multiplication of the first and second matrices, transferring the completed product results from the first partial products buffer circuit to a product array in the memory storage device, and in parallel to the transferring, continuing the first and second counts of iterations and storing the partial product results in the second partial products buffer.

In Aspect 12, the subject matter of Aspect 11 optionally includes allocating first and second partial products buffer circuits that each have first and second storage array dimensions corresponding to the count of multiplies in the parallel multiplication operation when both dimensions of the first matrix and the second matrix are multiples of the count of multiplies in the parallel multiplication operation.

In Aspect 13, the subject matter of Aspect 11 optionally includes allocating first and second partial products buffer circuits that each have a first storage array dimension corresponding to the count of multiplies in the parallel multiplication operation and a second storage array dimension greater than the count of multiplies in the parallel multiplication operation when at least one dimension of at least one of the first matrix or the second matrix is not a multiple of the count of multiplies in the parallel multiplication operation.

In Aspect 14, the subject matter of one or any combination of Aspects 9-13 optionally includes allocating a greater number of columns than a number of rows for the first partial products buffer circuit when a number of columns of the first matrix equals a number of rows of the second matrix and a number of columns of the second matrix is not a multiple of the count of multiplies in the parallel multiplication operation.

In Aspect 15, the subject matter of one or any combination of Aspects 9-13 optionally includes allocating a greater number of rows than a number of columns for the first partial products buffer circuit when a number of columns of the first matrix equals a number of rows of the second matrix and a number of rows of the first matrix is not a multiple of the count of multiplies in the parallel multiplication operation.

In Aspect 16, the subject matter of one or any combination of Aspects 9-15 optionally includes the parallel multiplication operations each include a memory fetch cycle and a compute cycle, and not more than two memory locations are read during the memory fetch cycle.

Aspect 17 includes subject matter (or can optionally be combined with one or any combination of Aspects 1-16 to include such subject matter) such as a computer readable storage medium containing instructions that, when performed by processing circuitry, cause the processing circuitry to perform acts comprising allocating a first and second prefetch buffer circuits, each prefetch buffer circuit having a storage array dimension corresponding to a count of multiplies performed simultaneously in a parallel multiplication operation, allocating a first partial products buffer circuit, loading the first prefetch buffer circuit with a count of values of a first matrix stored in memory to be multiplied, the count of values corresponding to the count of multiplies, and for a first count of iterations corresponding to the count of multiplies: reading a value of a second matrix to be multiplied and, in parallel with the reading, preloading the second prefetch buffer circuit with a value from the first matrix, initiating parallel multiplication of the values in the first prefetch buffer circuit with the read value of the second matrix, and storing partial product results of the parallel multiply in the first partial products buffer circuit, including adding a current partial product result to a previously stored partial product result.

In Aspect 18, the subject matter of Aspect 17 optionally includes a computer readable storage medium containing instructions that cause the processing circuitry to perform acts including reading another value of the second matrix and, in parallel with the reading, preloading the first prefetch buffer with a value from the first matrix, parallel multiplying the values in the second prefetch buffer with the other value of the second matrix, and storing partial product results of the parallel multiply in the first partial products buffer circuit, including adding a current partial product result to a previously stored partial product result.

In Aspect 19, the subject matter of Aspect 18 optionally includes a computer readable storage medium containing instructions that cause the processing circuitry to perform acts including allocating a second partial products buffer circuit, continuing the first and second counts of iterations and storing the partial product results in the first partial products buffer circuit until the partial product results are completed product results of multiplication of the first and second matrices, transferring the completed product results from the first partial products buffer circuit to a product array in the memory, and in parallel to the transferring, continuing the first and second counts of iterations and storing the partial product results in the second partial products buffer.

In Aspect 20, the subject matter of Aspect 19 optionally includes a computer readable storage medium containing instructions that cause the processing circuitry to perform acts including allocating first and second partial products buffer circuits that each have a first storage array dimension corresponding to the count of multiplies and a second storage array dimension greater than the count of multiplies when at least one dimension of at least one of the first matrix or the second matrix is not a multiple of the count of multiplies in the parallel multiplication operation.

The non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A matrix multiplication circuit comprising:
a memory storage device including memory circuitry to store a first matrix and a second matrix;
processing circuitry in communication with the memory storage device;
a parallel multiply circuit in communication with, or integral to, the processing circuitry, and configured to simultaneously perform a count of multiplies in a parallel multiplication operation;

first and second prefetch buffer circuits separate from memory circuitry of the memory storage device, each prefetch buffer circuit having a storage array dimension corresponding to the count of multiplies in the parallel multiplication operation; and a first partial products buffer circuit;

wherein the processing circuitry is configured to:

load the first prefetch buffer circuit with values from the first matrix; and for a first count of iterations corresponding to the count of multiplies:

fetch a value of the second matrix and, in parallel with the fetch, preload the second prefetch buffer circuit with another value from the first matrix;

initiate a parallel multiply of the fetched value of the second matrix and the values in the first prefetch buffer circuit; and store partial product results of the parallel multiply in the first partial products buffer circuit, including adding a current partial product result to a previously stored partial product result.

2. The matrix multiplication circuit of claim 1, wherein the processing circuitry is configured to, for a second count of iterations corresponding to the count of multiplies:

fetch another value in the second matrix and, in parallel with the fetch, preload the first prefetch buffer circuit with a value from the first matrix;

parallel multiply the values preloaded in the second prefetch buffer circuit with the fetched other value in the second matrix; and store partial product results of the parallel multiply in the first partial products buffer circuit, including adding a current partial product result to a previously stored partial product result.

3. The matrix multiplication circuit of claim 2, including:

a second partial products buffer circuit, wherein the first and second partial products buffer circuits are separate from the memory circuitry of the memory storage device; and wherein the processing circuitry is configured to:

continue the first and second counts of iterations and store and add the partial product results in the first partial products buffer circuit until the partial product results are completed product results of multiplication of the first and second matrices;

transfer the completed product results from the first partial products buffer circuit to a product array in the memory storage device; and in parallel to the transferring, continue the first and second counts of iterations and store the partial product results in the second partial products buffer.

4. The matrix multiplication circuit of claim 3, wherein the first and the second partial products buffer circuits each have first and second storage array dimensions corresponding to the count of multiplies in the parallel multiplication operation when both dimensions of the first matrix and the second matrix are multiples of the count of multiplies in the parallel multiplication operation.

5. The matrix multiplication circuit of claim 3, wherein the first and the second partial products buffer circuits each have a first storage array dimension corresponding to the count of multiplies in the parallel multiplication operation and a second storage array dimension greater than the count of multiplies in the parallel multiplication operation when at least one dimension of at least one of the first matrix or the second matrix is not a multiple of the count of multiplies in the parallel multiplication operation.

6. The matrix multiplication circuit of claim 1, wherein the first partial products buffer circuit is a two-dimensional storage array that includes a greater number of columns than a number of rows when a number of columns of the first matrix equals a number of rows of the second matrix and a number of columns of the second matrix is not a multiple of the count of multiplies in the parallel multiplication operation.

7. The matrix multiplication circuit of claim 1, wherein the first partial products buffer circuit is a two-dimensional storage array that includes a greater number of rows than a number of columns when a number of columns of the first matrix equals a number of rows of the second matrix and a number of rows of the first matrix is not a multiple of the count of multiplies in the parallel multiplication operation.

8. The matrix multiplication circuit of claim 1, wherein processing circuitry is configured to read only one value from the second matrix and read only one value of the first matrix for each parallel multiplication operation initiated.

9. A method of matrix multiplication of first and second matrices using parallel multiplication operations performed by a hardware processor, wherein the first and the second matrices are stored in a memory storage device, the method comprising:

allocating first and second prefetch buffer circuits separate from memory circuitry of the memory storage device, each prefetch buffer circuit having a storage array dimension corresponding to a count of multiplies performed simultaneously in a parallel multiplication operation;

allocating a first partial products buffer circuit;

loading the first prefetch buffer circuit with a count of values of the first matrix corresponding to the count of multiplies in the parallel multiplication operation; and for a first count of iterations corresponding to the count of multiplies in the parallel multiplication operation;

fetching a value in the second matrix and, in parallel with the fetch, preloading the second prefetch buffer circuit with a value from the first matrix;

parallel multiplying the values in the first prefetch buffer circuit with the fetched value in the second matrix; and storing partial product results of the parallel multiply in the first partial products buffer circuit, including adding a current partial product result to a previously stored partial product result.

10. The method of claim 9 including, after the first count of iterations and for a second count of iterations corresponding to the count of multiplies in the parallel multiplication operation:

fetching another value in the second matrix and, in parallel with the fetch, preloading the first prefetch buffer circuit with a value from the first matrix;

parallel multiplying the values preloaded in the second prefetch buffer circuit with the fetched other value of the second matrix; and storing partial product results of the parallel multiply in the first partial products buffer circuit, including adding a current partial product result to a previously stored partial product result.

11. The method of claim 10, including:

allocating a second partial products buffer circuit, wherein the first and second partial products buffer circuits are separate from the memory circuitry of the memory storage device;

continuing the first and second counts of iterations and storing and adding the partial product results in the first partial products buffer circuit until the partial product results are completed product results of multiplication of the first and second matrices;

transferring the completed product results from the first partial products buffer circuit to a product array in the memory storage device; and in parallel to the transferring, continuing the first and second counts of iterations and storing the partial product results in the second partial products buffer.

12. The method of claim 11, wherein allocating the first and the second partial products buffer circuits includes allocating first and second partial products buffer circuits that each have first and second storage array dimensions corresponding to the count of multiplies in the parallel multiplication operation when both dimensions of the first matrix and the second matrix are multiples of the count of multiplies in the parallel multiplication operation.

13. The method of claim 11, wherein allocating the first and the second partial products buffer circuits includes allocating first and second partial products buffer circuits that each have a first storage array dimension corresponding to the count of multiplies in the parallel multiplication operation and a second storage array dimension greater than the count of multiplies in the parallel multiplication operation when at least one dimension of at least one of the first matrix or the second matrix is not a multiple of the count of multiplies in the parallel multiplication operation.

14. The method of claim 9, wherein allocating the first partial products buffer circuit includes allocating a greater number of columns than a number of rows for the first partial products buffer circuit when a number of columns of the first matrix equals a number of rows of the second matrix and a number of columns of the second matrix is not a multiple of the count of multiplies in the parallel multiplication operation.

15. The method of claim 9, wherein allocating the first partial products buffer circuit includes allocating a greater number of rows than a number of columns for the first partial products buffer circuit when a number of columns of the first matrix equals a number of rows of the second matrix and a number of rows of the first matrix is not a multiple of the count of multiplies in the parallel multiplication operation.

16. The method of claim 9, wherein the parallel multiplication operations each include a memory fetch cycle and a compute cycle, and not more than two memory locations are read during the memory fetch cycle.

17. A non-transitory computer readable storage medium containing instructions that, when performed by processing circuitry, cause the processing circuitry to perform acts comprising:

allocating a first and second prefetch buffer circuits, each prefetch buffer circuit having a storage array dimension corresponding to a count of multiplies performed simultaneously in a parallel multiplication operation;

allocating a first partial products buffer circuit;

loading the first prefetch buffer circuit with a count of values of a first matrix stored in memory to be multiplied, the count of values corresponding to the count of multiplies; and for a first count of iterations corresponding to the count of multiplies:
  reading a value of a second matrix to be multiplied and, in parallel with the reading, preloading the second prefetch buffer circuit with a value from the first matrix;
  initiating parallel multiplication of the values in the first prefetch buffer circuit with the read value of the second matrix; and
  storing partial product results of the parallel multiply in the first partial products buffer circuit, including adding a current partial product result to a previously stored partial product result.

18. The non-transitory computer readable storage medium of claim 17, further containing instructions that cause the processing circuitry to perform acts including, after the first count of iterations and for a second count of iterations corresponding to the count of multiplies:

reading another value of the second matrix and, in parallel with the reading, preloading the first prefetch buffer with a value from the first matrix;

parallel multiplying the values in the second prefetch buffer with the other value of the second matrix; and storing partial product results of the parallel multiply in the first partial products buffer circuit, including adding a current partial product result to a previously stored partial product result.

19. The non-transitory computer readable storage medium of claim 18, further containing instructions that cause the processing circuitry to perform acts including:

allocating a second partial products buffer circuit;

continuing the first and second counts of iterations and storing the partial product results in the first partial products buffer circuit until the partial product results are completed product results of multiplication of the first and second matrices;

transferring the completed product results from the first partial products buffer circuit to a product array in the memory; and in parallel to the transferring, continuing the first and second counts of iterations and storing the partial product results in the second partial products buffer.

20. The non-transitory computer readable storage medium of claim 19, further containing instructions that cause the processing circuitry to perform acts including allocating first and second partial products buffer circuits that each have a first storage array dimension corresponding to the count of multiplies and a second storage array dimension greater than the count of multiplies when at least one dimension of at least one of the first matrix or the second matrix is not a multiple of the count of multiplies in the parallel multiplication operation.

* * * * *